(12) United States Patent
He et al.

(10) Patent No.: US 11,145,225 B2
(45) Date of Patent: Oct. 12, 2021

(54) OPTICAL ELEMENT AND SHELF LAMP WITH THE OPTICAL ELEMENT

(71) Applicants: Self Electronics Co., Ltd., Zhejiang (CN); Wanjiong Lin, Zhejiang (CN); Self electronics USA Corporation, Norcross, GA (US)

(72) Inventors: Zuping He, Zhejiang (CN); Jun Yang, Zhejiang (CN); Jianguo Dong, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/836,158

(22) Filed: Mar. 31, 2020

(65) Prior Publication Data
US 2020/0402428 A1 Dec. 24, 2020

(30) Foreign Application Priority Data
Jun. 20, 2019 (CN) .......................... 201910538627.5

(51) Int. Cl.
| | |
|---|---|
| *G09F 3/20* | (2006.01) |
| *F21V 3/02* | (2006.01) |
| *F21V 8/00* | (2006.01) |
| *G09F 13/04* | (2006.01) |
| *G09F 13/14* | (2006.01) |

(52) U.S. Cl.
CPC ................ *G09F 3/204* (2013.01); *F21V 3/02* (2013.01); *G02B 6/003* (2013.01); *G02B 6/0036* (2013.01); *G09F 13/0413* (2013.01); *G09F 13/14* (2013.01); *G09F 13/0445* (2021.05); *G09F 2013/142* (2013.01)

(58) Field of Classification Search
CPC ......... F21V 3/02; G02B 6/003; G02B 6/0036; G09F 13/0413; G09F 13/14; G09F 2013/0445; G09F 2013/142; G09F 3/204
See application file for complete search history.

(56) References Cited

U.S. PATENT DOCUMENTS

| | | | | |
|---|---|---|---|---|
| 5,506,929 A | * | 4/1996 | Tai ....................... | G02B 6/0038 385/146 |
| 7,121,675 B2 | * | 10/2006 | Ter-Hovhannisian | ...................... A47F 3/001 362/92 |
| 7,565,054 B2 | * | 7/2009 | Rinko .................. | G02B 6/0018 385/146 |
| 8,905,610 B2 | * | 12/2014 | Coleman .............. | G02B 6/0076 362/554 |
| 9,920,901 B2 | * | 3/2018 | Wilcox .................. | F21V 5/007 |

(Continued)

*Primary Examiner* — Tsion Tumebo
(74) *Attorney, Agent, or Firm* — Wang Law Firm, Inc.

(57) ABSTRACT

An optical element includes a rectangular light guide plate, a light source setting portion, a parallel light lens group, and a total reflection lens group, disposed between the parallel light lens group and the first side surface, a part of the parallel light from the parallel light lens group is subjected to total reflection at least once to form a first parallel light parallel to the front surface, and the first parallel light enters the first side surface to make the second side surface emit light; another part of the parallel light from the parallel light lens group is totally reflected at least twice to form a second parallel light oblique to the front surface, and the second parallel light enters the first side surface to make the front surface emit light.

14 Claims, 12 Drawing Sheets

(56) References Cited

U.S. PATENT DOCUMENTS

| | | | | |
|---|---|---|---|---|
| 10,068,173 | B2 * | 9/2018 | Vayser | A61B 1/07 |
| 10,209,426 | B2 * | 2/2019 | Fukuma | G02B 6/0065 |
| 10,508,815 | B2 * | 12/2019 | Signorino | F21V 7/22 |
| 10,641,458 | B2 * | 5/2020 | Xiang | B60Q 1/2607 |
| 10,775,013 | B2 * | 9/2020 | O | F21S 43/249 |
| 2003/0137828 | A1 * | 7/2003 | Ter-Hovhannisian | A47F 3/0404 |
| | | | | 362/92 |
| 2011/0199767 | A1 * | 8/2011 | Marquardt | F21V 7/16 |
| | | | | 362/235 |
| 2013/0155723 | A1 * | 6/2013 | Coleman | G02B 6/0018 |
| | | | | 362/621 |
| 2014/0071694 | A1 * | 3/2014 | Zhang | G02B 19/0061 |
| | | | | 362/309 |
| 2014/0153279 | A1 * | 6/2014 | Weyer | A47F 11/10 |
| | | | | 362/604 |
| 2014/0340931 | A1 * | 11/2014 | Nishitani | G02B 6/0061 |
| | | | | 362/609 |
| 2015/0070928 | A1 * | 3/2015 | Rau | G02B 6/0081 |
| | | | | 362/604 |
| 2017/0269278 | A1 * | 9/2017 | Fukuma | G02B 6/0065 |
| 2018/0128494 | A1 * | 5/2018 | Signorino | G02B 6/00 |

* cited by examiner

OPTICAL ELEMENT AND SHELF LAMP WITH THE OPTICAL ELEMENT

RELATED APPLICATION

This application claims priority to a Chinese Patent Application No. CN 201910538627.5, filed on Jun. 20, 2019.

FIELD OF THE TECHNOLOGY

The present invention relates to the field of lighting technology, with particular emphasis on an optical element having light on three sides and a shelf lamp with the optical element.

BACKGROUND OF THE INVENTION

Supermarkets, shopping malls, museums, exhibition halls and other places use a large number of shelves to display the items being displayed. In actual use, generally shelves will be provided with at least two layers of boards. The lighting between these boards generally comes from light sources in two directions, one is the light source on the top of buildings such as supermarkets, shopping malls, etc., and the other is the light source provided in each layer.

At the same time, in order to better display the goods or sign the price, shelves are generally equipped with labels. For a clearer view of the label's contents, the label can also be set to glow, such as powering the label or using an electronic screen. No matter which method is used, it needs to be energized, and the common way to energize is to connect to the power supply through wires.

It can be seen that the above light sources and labels need to be energized. At this time, a lot of wires need to be provided to realize electrification and the problem of wire entanglement will occur, which is neither beautiful nor safe. In order to solve the above problems, some researchers have adopted the method of introducing part of the light into the labels, allowing part of the light to pass through to illuminate the lower shelf, and the other part of the light to reflect into the light guide plate, which is guided to the price tag by the light guide plate to realize an LED light bar lights up the three-dimensional space that needs to be illuminated, such as the lower shelves and price tags.

At the same time, in order to improve the lighting effect in the shelves, it is hoped that the goods can be illuminated by the upper and lower lights, but this setting requires increasing the number of lamp bars and increasing the cost.

BRIEF SUMMARY OF THE INVENTION

In view of this, the present invention provides an optical element that emits light on three sides and a shelf lamp with the optical element to solve the above technical problems.

An optical element, comprising:

a rectangular light guide plate, comprising a front surface for light outgoing, a bottom surface for guiding light, a first side surface for receiving light and a second side surface opposite to the first side surface;

a light source setting portion, located on the outer side of the bottom surface near the first side surface and provided with a central axis where the light source is set, and a light emitting direction of the light source faces away from the rectangular light guide plate;

a parallel light lens group, disposed at a side of the light source setting portion near the rectangular light guide plate;

and a total reflection lens group, disposed between the parallel light lens group and the first side surface, a part of the parallel light from the parallel light lens group is subjected to total reflection at least once to form a first parallel light parallel to the front surface, and the first parallel light enters the first side surface to make the second side surface emit light; another part of the parallel light from the parallel light lens group is totally reflected at least twice to form a second parallel light oblique to the front surface, and the second parallel light enters the first side surface to make the front surface emit light.

the parallel light lens group comprises at least one convex lens arranged along a light-emitting direction of the light source.

the convex lens comprises a flat light incident surface and an arc-shaped light outgoing surface provided on a side of the light source setting portion.

the convex lens further comprises an arc-shaped light incident surface provided between the flat light incident surface and the central axis, and a parallel light total reflection surface arranged along the light exit direction outside the arc-shaped light incident surface, and the reflected light of the parallel light total reflection surface is directed toward the total reflection lens group.

the parallel light total reflection surface is an arc-shaped surface.

the total reflection lens group comprises:

a first total reflection surface, disposed on a side of the parallel light lens group away from the light source and totally reflecting parallel light from the parallel light lens group;

a second total reflection surface, disposed on a side of the first total reflection surface near the rectangular light guide plate to form a first parallel light;

and a third total reflection surface, disposed on the opposite side of the second total reflection surface to form a second parallel light.

the light incident surface corresponding to the first total reflection surface is disposed between the parallel light lens group and the total reflection lens group.

the light incident surface corresponding to the first total reflection surface is an arc-shaped surface.

the rectangular light guide plate and the total reflection lens group are integrally molded and manufactured.

the rectangular light guide plate, the total reflection lens group, and the parallel light lens group are integrally formed and manufactured.

the second side surface is provided with a light diffusion structure.

the bottom surface is provided with a plurality of strip-shaped light guide curved surfaces, and the light guide curved surface extends along a direction parallel to the first side surface and is arranged parallel to each other along a direction perpendicular to the first side surface.

an separation distance between adjacent light guide curved surfaces becomes smaller and smaller as the direction away from the light source setting portion.

the curvature of the light guide curved surface increases as the light guide curved surface is away from the direction of the light source setting portion.

further comprising a condenser lens provided at the light source setting portion.

the condenser lens comprises:

a first light incident surface, disposed in a middle region in a light emitting direction of the light source setting portion;

a second light incident surface, disposed on a side of the light source setting portion away from the rectangular light guide plate in a light emitting direction;

a first light outgoing surface, disposed outside the first light incident surface along the light exit direction;

a fourth total reflection surface, disposed between the second light incident surface and the first light outgoing surface, and configured to totally reflect light from the second light incident surface to the first light outgoing surface.

the condenser lens and the parallel light lens group are integrally molded and manufactured.

the rectangular light guide plate is diffusion plate with a diffusing agent,

A shelf lamp with the above optical element, comprising a mounting bracket, a printed circuit board, a light source, and the optical element provided on the mounting bracket.

The shelf lamp further comprising a lamp cover disposed outside the light source and connected to the mounting bracket.

the optical element and the lamp cover are integrally manufactured.

the lamp cover is a closed cavity in a plane perpendicular to the length direction of the printed circuit board.

the lamp cover is combined with the optical element to form the closed cavity.

The printed circuit board is disposed in the lamp cover and divides the lamp cover into a light emitting region facing away from the rectangular light guide plate and an electrical element region facing to the rectangular light guide plate.

The lamp cover uses a diffusion lamp cover.

Technical effects of the invention:

the light source for illuminating the optical element and the shelf light with the optical element of the present invention, the front light of the rectangular light guide plate is used to light the label, and the light is emitted on the other side of the rectangular light guide plate through the light guide, therefore, in the case of a single light source, light can be emitted on three sides and the lighting effect on the shelf can be improved.

BRIEF DESCRIPTION OF THE DRAWINGS

The following describes embodiments of the present invention with reference to the accompanying drawings, in which.

DETAILED DESCRIPTION OF THE INVENTION

Hereinafter, specific embodiments of the present invention will be described in further detail based on the drawings. It should be understood that the description of the embodiments of the present invention is not intended to limit the protection scope of the present invention.

Embodiment 1

As shown in FIG. 1 to 8, the three-sided light-emitting optical element in this embodiment includes a rectangular light guide plate 100, a light source setting portion 200, a parallel light lens group 300, and a total reflection lens group 400.

Figure 1:
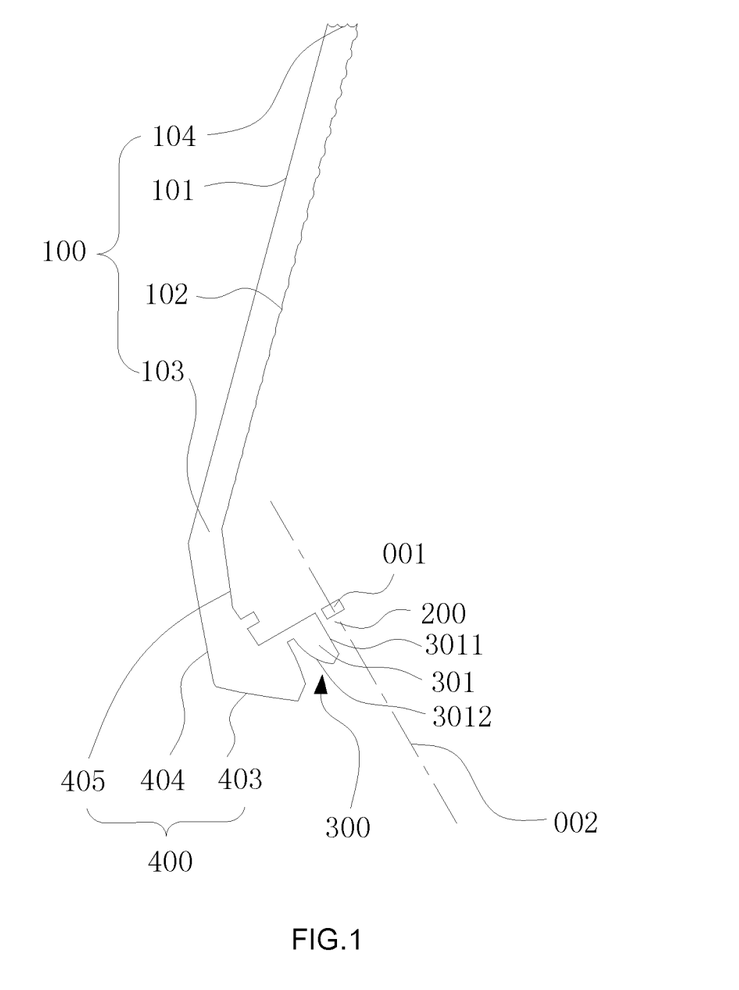
FIG. 1 is a schematic structural diagram of a three-sided light-emitting optical element in embodiment 1.

The rectangular light guide plate 100 includes a front surface 101 for emitting light, a bottom surface 102 for guiding light, a first side surface 103 for receiving light, and a second side surface 104 opposite to the first side surface 103; the rectangular light guide plate 100 is for illuminating the label plate installed on the front surface 101, in the same principle as the prior art. The rectangular light guide plate 100 is equipped with a light guide unit on the bottom surface 102, and the first side surface 103 is used to realize the stay of the light from the light source on the surface of the rectangular light guide plate 100. When light hits each light guide unit, the reflected light diffuses to various angles, and then the reflection conditions are destroyed, and the light is emitted from the front surface 101 of the rectangular light guide plate 100. By using various light guide units with different size and density, the front surface 101 can emit light uniformly. A reflection sheet can also be provided to reflect the light exposed on the back to the light guide plate to improve the efficiency of light use. The structure of the light guide unit is various. In order to facilitate processing, in this embodiment, the bottom surface 102 is provided with a plurality of strip-shaped light guide curved surface 1021. The light guide curved surface 1021 extends along a direction parallel to the first side surface 103 and is arranged parallel to each other along a direction perpendicular to the first side surface 103. In order to uniformly emit light on the front surface 101, the separation distance between adjacent light guide curved surfaces 1021 becomes smaller and smaller as the direction away from the light source setting portion 200, and the curvature of the light guide curved surface 1021 increases as the light guide curved surface 1021 is away from the direction of the light source.

The light source setting portion 200 is located on the outer side of the bottom surface 102 near the first side surface 103 and provided with a central axis 002 where the light source 001 is set. The light emitting direction of the light source 001 faces away from the rectangular light guide plate 100, this is because light source 001 needs to illuminate the goods behind the label plate and the goods are set on the layer board.

Figure 2:
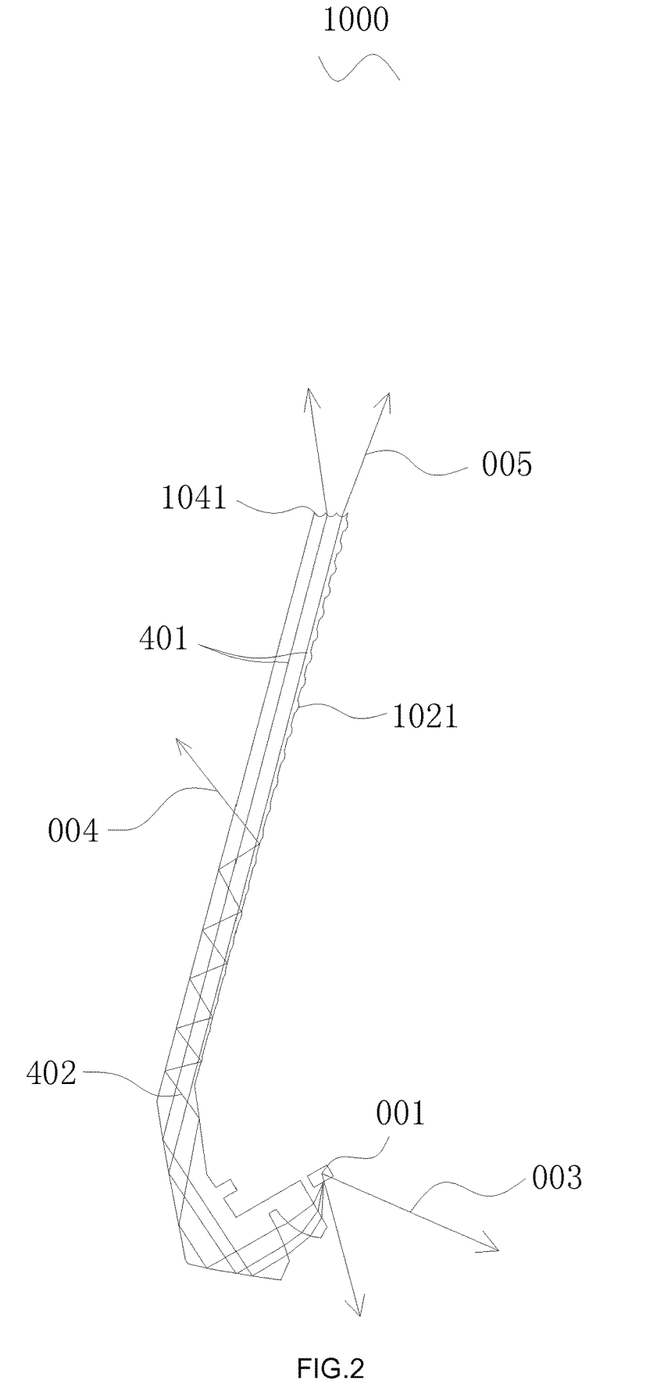
FIG. 2 is a schematic diagram of an optical path of an optical element emitting light on three sides in embodiment 1.

The parallel light lens group 300 is disposed on a side of the light source setting portion 200 near the rectangular light guide plate 100 and is configured to adjust the light of the light source 001 provided on the light source setting portion 200 near the rectangular light guide plate 100 to be parallel light. The parallel light here does not mean absolute parallel, but relative. This part of the light can enter the rectangular light guide plate 100 in parallel and exit on the second side surface 104. Specifically, the total reflection lens group 400 is set between the parallel light lens group 300 and the first side surface 103, a part of the parallel light from the parallel light lens group 300 is totally reflected at least once to form a first parallel light 401 parallel to the front surface 101, and the first parallel light enters the first side surface 103 so that the second side surface 104 emits light; at the same time, another part of the parallel light from the parallel light lens group 300 is totally reflected at least twice to form a second parallel light 402 oblique to the front surface 101, and the second parallel light enters the first side surface 103 to make the front surface 101 emit light.

The above structure makes the optical element of this embodiment have the effect of emitting light on three sides. First, the light 003 of the light source 001 at the light source setting portion 200 illuminates one side of the rectangular light guide plate 100, and the light 004 from the front surface 101 is used to light the label plate. The light 005 from the second side surface 104 illuminates the other side of the rectangular light guide plate 100, so that light can be emitted from three sides under a single light source, and the lighting effect on the shelf is improved.

The formation of the parallel light takes various forms. In order to facilitate design and manufacture, in this embodiment, the parallel light lens group 300 includes at least one convex lens 301 arranged along the light emitting direction of the light source 001. The convex lens 301 can adjust the light output from the light source 001 to be relatively parallel light.

Specifically, in order to simplify the structure, the convex lens 301 includes a flat light incident surface 3011 and an arc-shaped light outgoing surface 3012 disposed on one side of the light source setting portion 200.

The more total reflection surfaces provided by the total reflection lens group 400, the larger the angle of light deflection, which can be set as required. In this embodiment, the total reflection lens group 400 includes a first total reflection surface 403, a second total reflection surface 404 and a third total reflection surface 405. Specifically, the first total reflection surface 403 is disposed on one side of the parallel light lens group 300 away from the light source and totally reflects the parallel light from the parallel light lens group 300. The second total reflection surface 404 is provided on one side of the first total reflection surface 403 near the rectangular light guide plate 100 and reflects the parallel light from the first total reflection surface 403, and partly forms a first parallel light 401; the third total reflection surface 405 is disposed on the opposite side of the second total reflection surface and the parallel light from the second total reflection surface 404 is reflected to form a second parallel light 402.

The light incident surface corresponding to the first total reflection surface 403 is disposed between the parallel light lens group 300 and the total reflection lens group 400. The light incident surface corresponding to the first total reflection surface 403 is an arc-shaped surface and the light from the parallel light lens group 300 can be further adjusted to improve the parallelism. The light incident surface corresponding to the first total reflection surface 403 can also be defined as one of the convex lenses 301. That is, in this embodiment, two convex lenses 301 are provided.

The above-mentioned optical components can be assembled and fixed together after being manufactured separately. In order to facilitate manufacturing and make the structure compact, the rectangular light guide plate 100 and the total reflection lens group 400 are integrally molded and manufactured. The first side surface 103 of the rectangular light guide plate 100 extends toward the light source setting portion 200 to form a total reflection lens group 400. There are other ways to work, the rectangular light guide plate 100, the total reflection lens group 400 and the parallel light lens group 300 are integrally formed and manufactured.

In order to increase the illumination range of the second side surface 104, the second side surface 104 is provided with a light diffusion structure, so that the first parallel light 401 is diffused to have a larger light emitting angle.

The shelf lamp of this embodiment includes a mounting bracket 600, a printed circuit board 700, a lamp cover 800, a light source 001, and three-sided light-emitting optical elements 1000 disposed on the mounting bracket 600.

Figure 3:
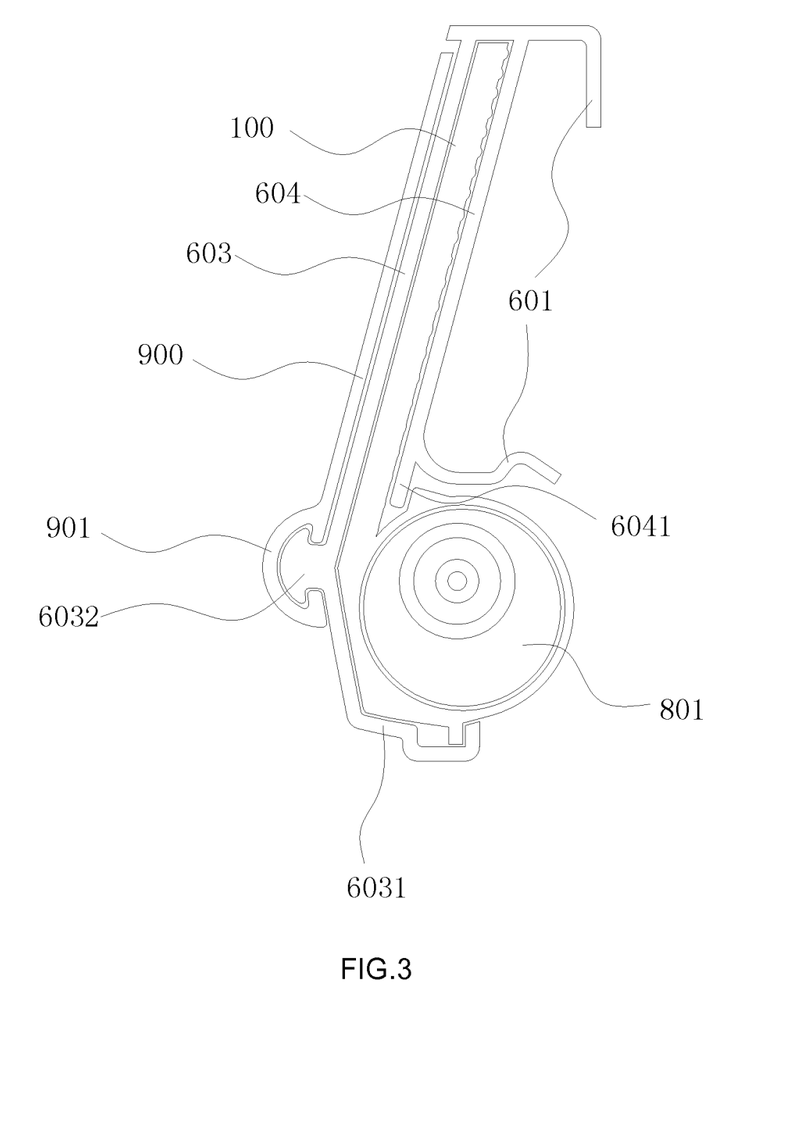
FIG. 3 is a schematic structural diagram of a shelf lamp of embodiment 1.
Figure 4:
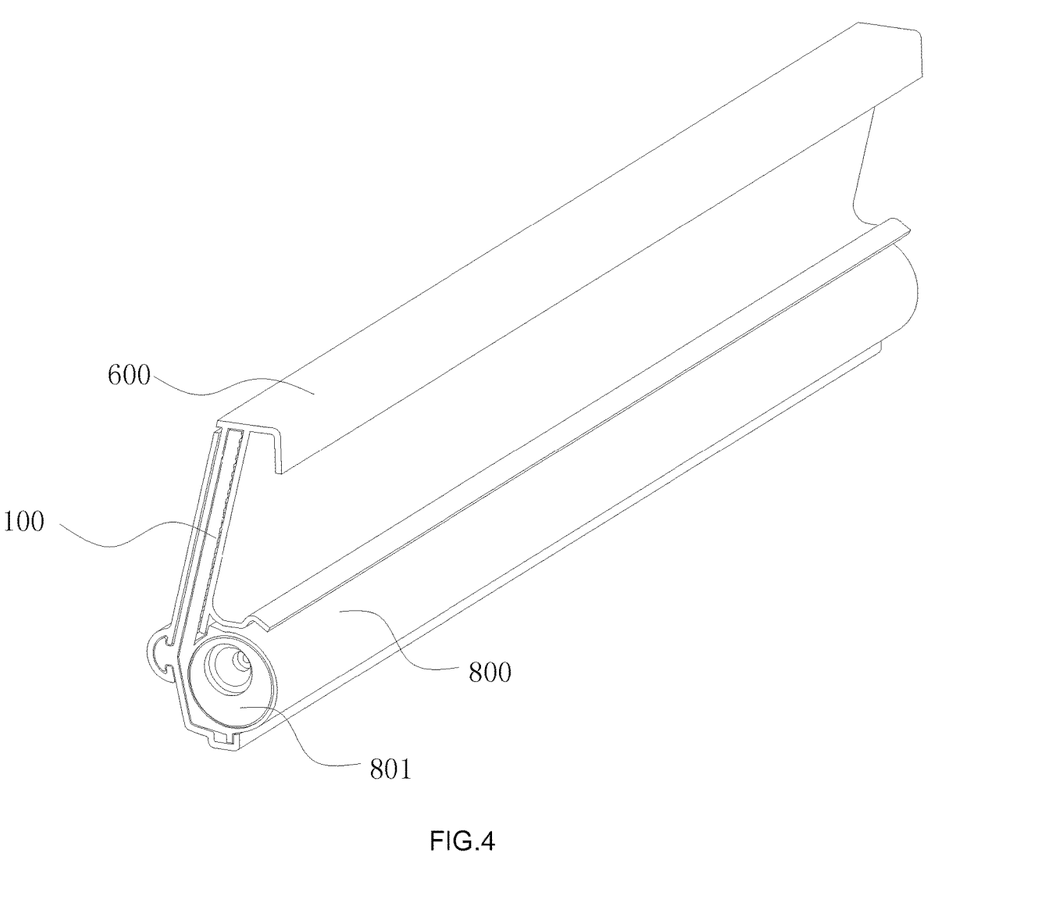
FIG. 4 is a schematic diagram of a three-dimensional structure of the shelf lamp of embodiment 1.
Figure 5:
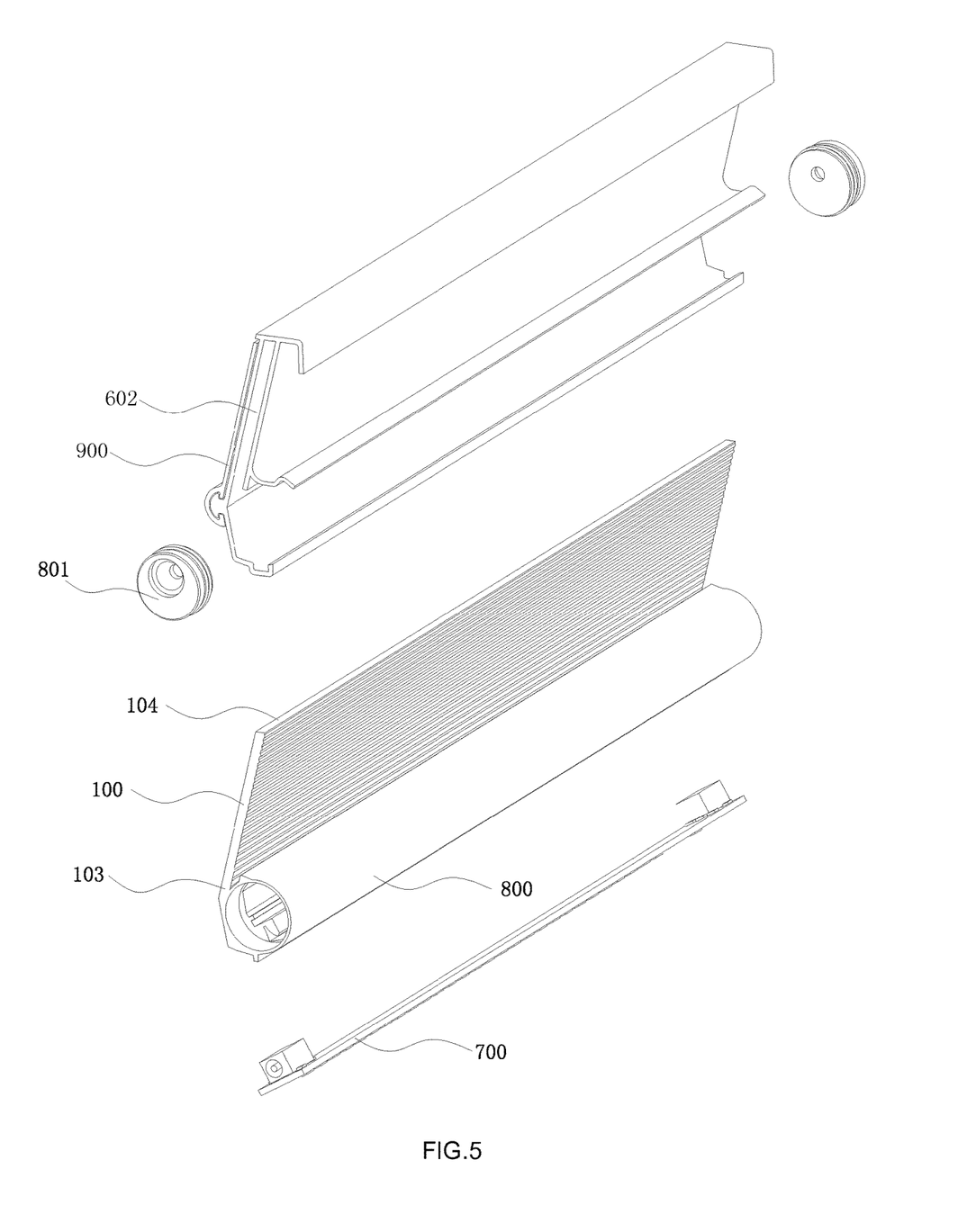
FIG. 5 is a schematic diagram of an exploded structure of the shelf lamp of embodiment 1.

The mounting bracket 600 is used to mount the shelf lamp to a shelf, a freezer, a showcase, etc., and they are fixedly connected by bolts or connected by a snap structure, or bonded by glue. In order to facilitate installation and removal, in this embodiment, the mounting bracket 600 includes a shelf connector 601 and a strip cavity 602.

Figure 6:
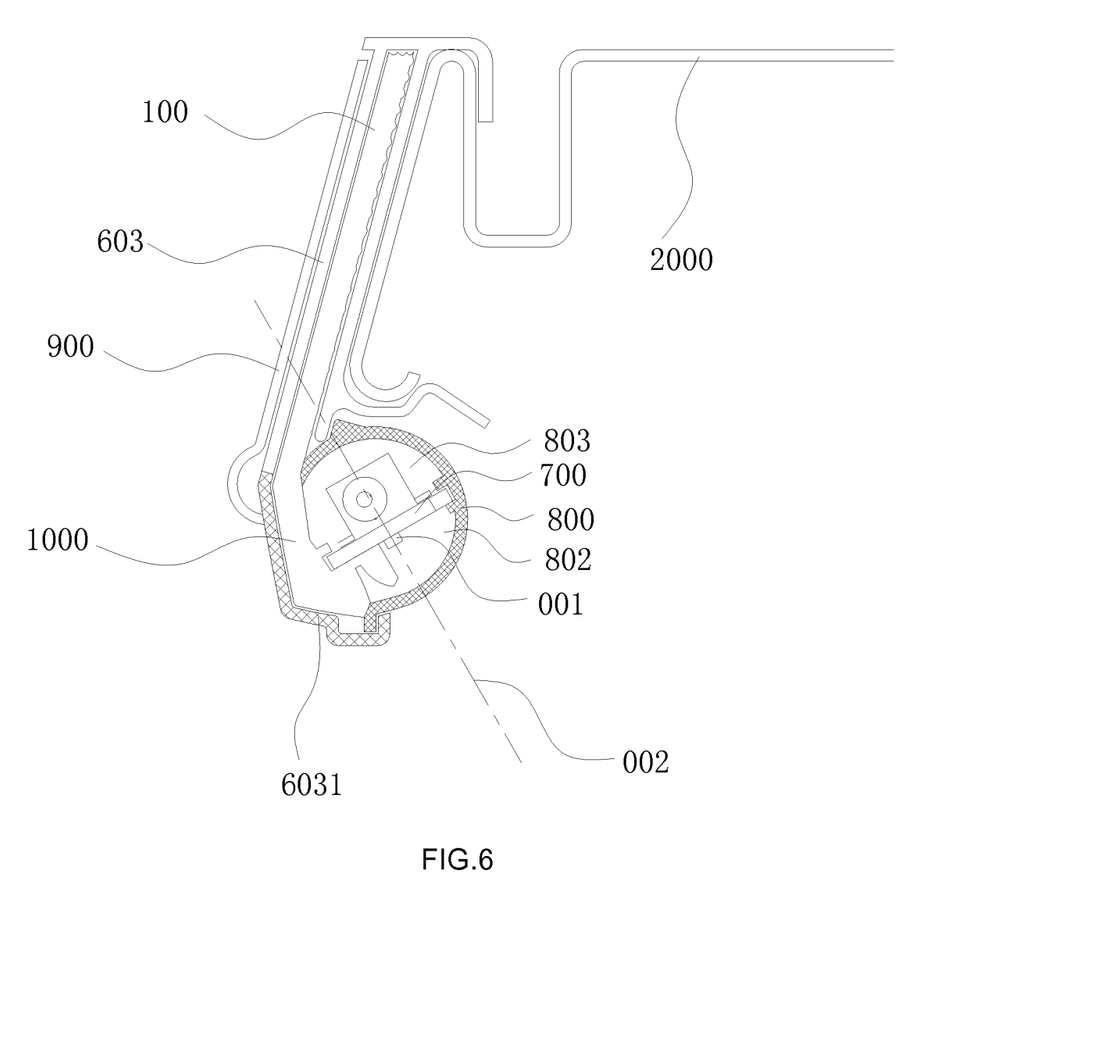
FIG. 6 is a schematic cross-sectional structure diagram of the shelf lamp of embodiment 1.

The shelf connector 601 is used to connect the layer boards of shelves. The plane on which the layer board is located is a horizontal plane. The shelf connector 601 adopts bayonet structure for easy disassembling and assembling. The strip cavity 602 is provided on the shelf connector 601 and the strip cavity 602 includes a transparent front baffle 603 and a back baffle 604. The rectangular light guide plate 100 is disposed between the front baffle 603 and the back baffle 604. The front baffle 603 and the back baffle 604 can fix the rectangular light guide plate 100 on the one hand and protect the rectangular light guide plate 100 on the other hand. The transparent front baffle 603 transmits light and illuminates the label plate fixed on its surface. In order to facilitate the fixing and replacement of the label plates, the outer surface of the front baffle 603 is provided with removable label plate splint 900. the two ends of the outer surface of the front baffle 603 are provided with a raised clasp position 6032, and the two ends of the label plate splint 900 are provided with buckles 901 matching with the clasp position 6032, so as to achieve the fixation of the label plate splint 900 and the front baffle 603, and the label plate is set between the label plate splint 900 and the front baffle 603.

Light source 001 is placed on the printed circuit board 700, and the printed circuit board 700 is fixed on one side of the bottom surface 102, which can be the upper side or the lower side. In this embodiment, the printed circuit board 700 is arranged on the lower side of the bottom surface 102. The included angle of the central axis 002 of light source 001 and the plane of the front surface 101 is 30°~90°, and the horizontal downward tilt angle of the central axis 002 of light source 001 relative to the horizontal plane is 40°~80°. This is because the label plate is usually set on the outermost part of the layer boards and the light source 001 needs to illuminate the inner part of the layer boards. The light source 001 is disposed on the light source mounting surface of the printed circuit board 700, and the light emitting direction faces away from the rectangular light guide plate 100 to form light 003 for illuminating the layer boards from top to bottom.

The lamp cover 800 is disposed outside the light source 001 and is connected to the mounting bracket 600. The lamp cover 800 has the effect of sealing and protecting and have the effect of uniform light, the sealed end covers 801 are also provided on both sides of the lamp cover.

In order to simplify the structure and facilitate the manufacture and installation, the optical element 1000 and the lamp cover 800 are integrally manufactured. In particular, the extrusion molding method can be adopted, the manufacturing cost is low, the smoothness is good, and the light output effect is improved. The multi-color extrusion can also be used to adjust the colors of the optical element 1000 and the lamp cover 800 according to different need, realizing better effect of emitting light.

In order to facilitate installation and manufacturing, in this embodiment, one side of the front baffle 603 near the total reflection lens group 400 extends outward and is bent toward the back baffle 604 to form a first fixing member 6031, and one side of the back baffle 604 close to the total reflection lens group 400 is the second fixing member 6041. The integrally manufactured optical element 1000 and the lamp cover 800 are disposed between the first fixing member 6031 and the second fixing member 6041. The shelf connector 601 is a clasp provided on the outside of the back baffle 604 and connected with the layer board 2000.

For the compactness of the structure, in this embodiment, the parallel light lens group 300 is disposed in the lamp cover 800. In order to improve the sealing and waterproof effect, the profile of the lamp cover 800 perpendicular to the length direction of the printed circuit board 700 is closed structure. Further preferably, the lamp cover 800 is enclosed with the optical element 1000 to form a closed cavity. In this embodiment, the closed cavity has a cylindrical structure.

The printed circuit board 700 is disposed in the lamp cover 800 and divides the lamp cover 800 into a light emitting region 802 facing away from the rectangular light guide plate 100 and an electrical element region 803 facing to the rectangular light guide plate 100. In this embodiment, the printed circuit board 700 is installed by providing a slot inside the closed cavity.

In order to make the structure more compact, in this embodiment, the lamp cover 800 is a semi-closed structure. One end is connected to one side of the third total reflection surface 405 close to the rectangular light guide plate 100, and the other end is connected to the top end of the light incident surface of the first total reflection surface 403.

The lamp cover 800 uses a diffusion lamp cover and the rectangular light guide plate 100 is a diffusion plate with a diffusing agent, which can destroy the refraction angle of part of the light, so that the light emitting effect of the front surface 101 is more uniform and the second side surface 104 achieves the light emitting effect of the linear light source. The ratio of the diffusing agent in the rectangular light guide plate 100 is 0.2 to 1 g/kg.

The parallel light lens group 300 and the total reflection lens group 400 are made of transparent materials or made in other ways to achieve the same effect, and the light transmittance of the rectangular light guide plate 100 is higher than that of the lamp cover 800. Therefore, when integrated molding, a three-color extrusion technology is required. In order to facilitate manufacturing, the parallel light lens group 300 and the total reflection lens group 400 are made of the same material as the rectangular light guide plate 100. At this time, only two-color extrusion is required to complete the integral molding.

Figure 7:
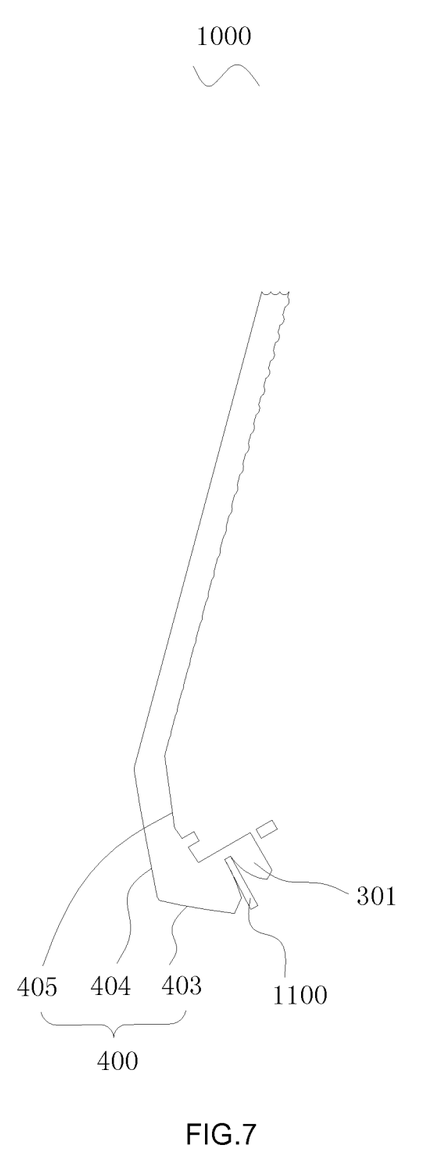
FIG. 7 is a schematic structural diagram of a three-sided light-emitting optical element (with a diffusion film) in embodiment 1.
Figure 8:
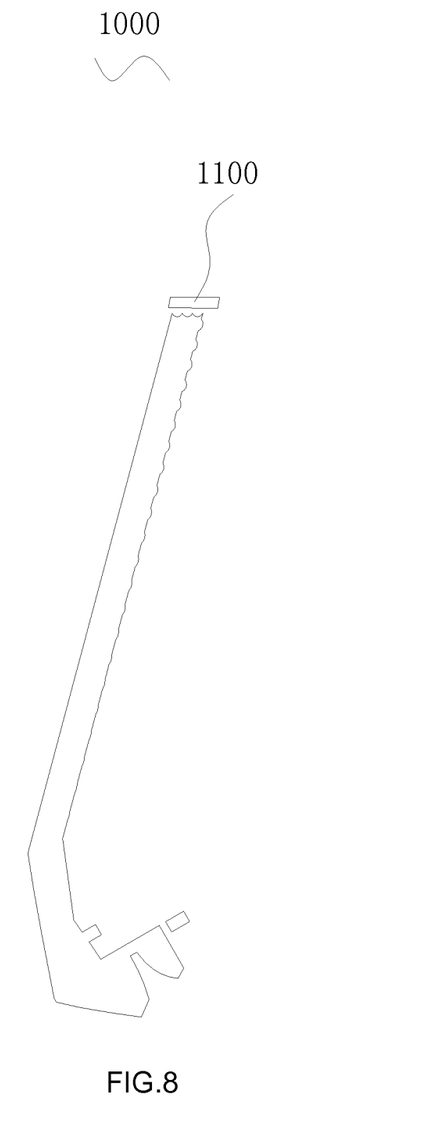
FIG. 8 is a schematic structural diagram of a three-sided light-emitting optical element (a diffusion film is added at another position) in embodiment 1.

In order to make the second side surface 104 achieve the light emitting effect of the linear light source, in addition to adding a diffusing agent, a diffusion film can also be provided. A diffusion film can be arranged on the light path of the rectangular light guide plate 100, the parallel light lens group 300 and the total reflection lens group 400. As shown in FIGS. 7 and 8, the diffusion film 1100 is respectively disposed above the parallel light lens group 300 and the second side surface 104. The diffusion film 1100 is an elliptical light diffusion film and the model used is E-6010. Of course, other models can also be selected, as long as the point light source 001 is stretched in the length direction, such as E-1560, E-0160/6001, E-0190. In order to achieve a better stretching and diffusion effect, when the diffusion film is selected, the stretching ratio in two directions is greater than 4. The elliptical light diffusing film in this embodiment is a positive cylindrical microlens array. The film form has a small volume, is convenient for installation, and can be flexibly set to meet the requirements of different lamp structures.

Embodiment 2

Figure 9:
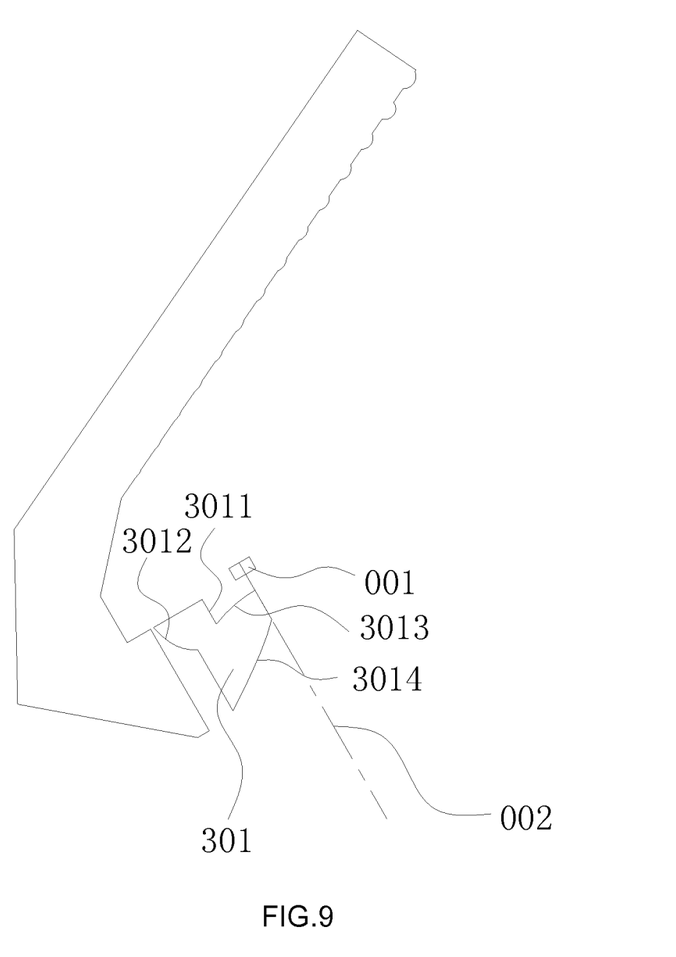
FIG. 9 is a schematic structural diagram of a three-sided light emitting optical element in embodiment 2.
Figure 10:
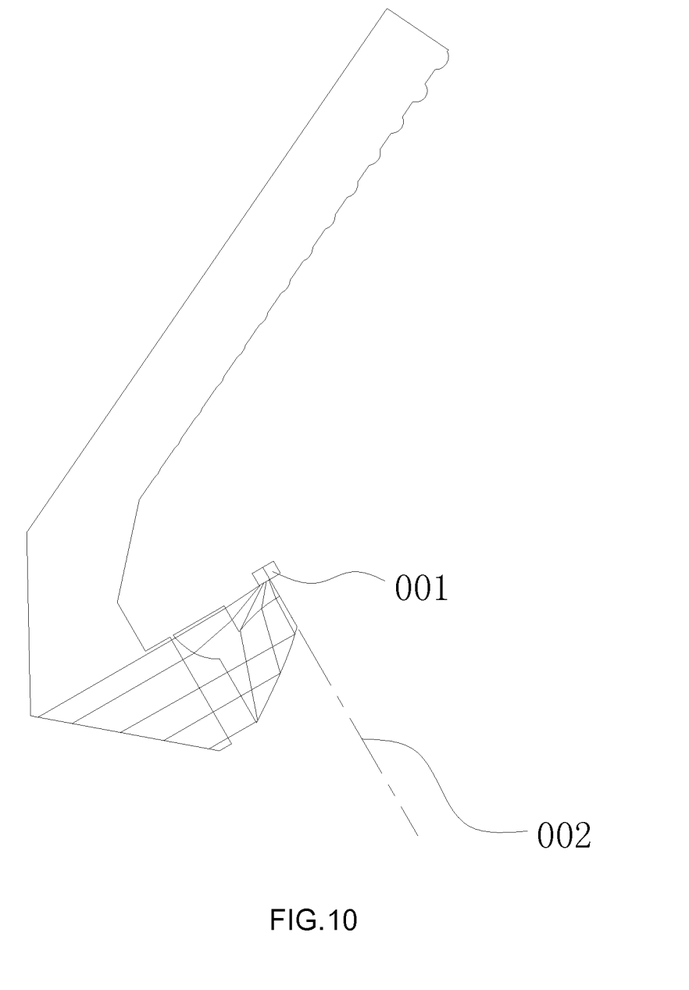
FIG. 10 is a schematic diagram of an optical path of an optical element emitting light on three sides in embodiment 2.

As shown in FIGS. 9 and 10, in this embodiment, the structure is the same as that of Embodiment 1 except that the structure of the convex lens 301 is different from that of embodiment 1.

In this embodiment, the convex lens 301 includes a flat light incident surface 3011 and an arc-shaped light outgoing surface 3012 disposed on one side of the light source setting portion 200. In order to guide more light into the rectangular light guide plate 100, the convex lens 301 further includes an arc-shaped light incident surface 3013 provided between the flat light incident surface 3011 and the central axis 002 and a parallel light total reflection surface 3014 arranged along the light exit direction on the outside of the arc-shaped light incident surface 3013. The reflected light of the parallel light total reflection surface 3014 is directed toward the total reflection lens group 400. In order to improve the parallelism of the parallel light, the parallel light total reflection surface 3014 is an arc-shaped surface, and the light with better parallelism can be obtained.

Embodiment 3

Figure 11:
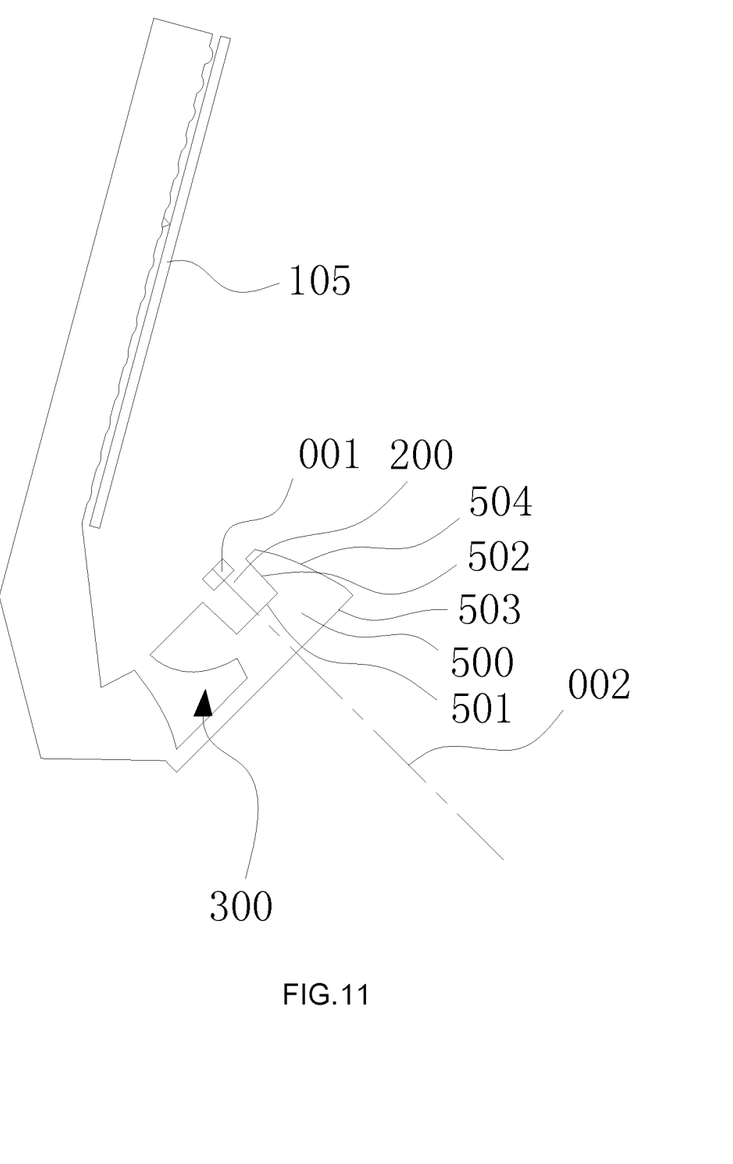
FIG. 11 is a schematic structural diagram of an optical element emitting light on three sides in embodiment 3.
Figure 12:
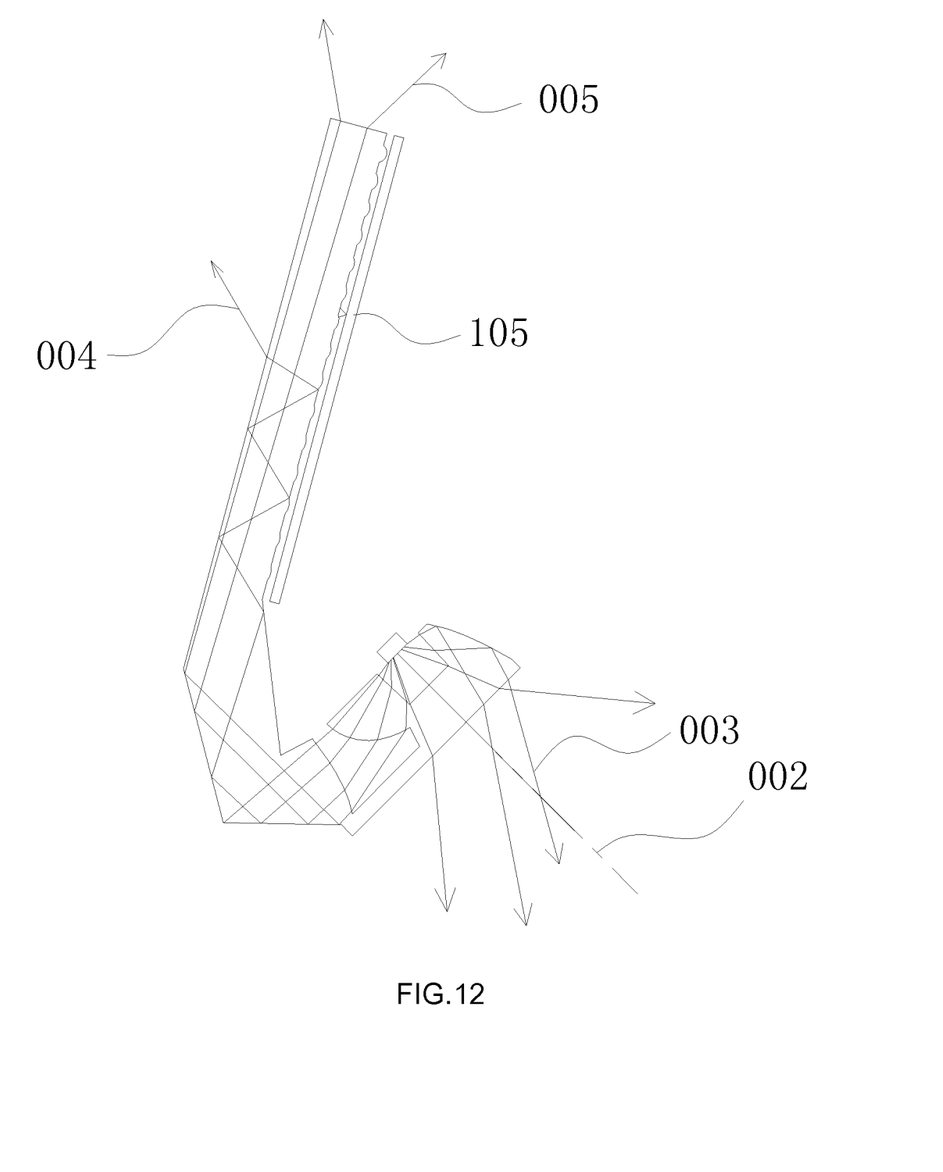
FIG. 12 is a schematic diagram of an optical path of an optical element emitting light on three sides in embodiment 4.

As shown in FIGS. 11 and 12, in this embodiment, in addition to embodiment 1, more optical structures are added. The optical element of this embodiment further includes a condenser lens 500 provided at the light source setting portion 200.

The condenser lens 500 includes a first light incident surface 501, a second light incident surface 502, a first light outgoing surface 503 and a fourth total reflection surface 504. The first light incident surface 501 is disposed in a middle region in the light emitting direction of the light source setting portion 200, and the second light incident surface 502 is disposed on a side of the light source setting portion 200 that is far from the rectangular light guide plate 100 in the light output direction; The first light outgoing surface 503 is disposed outside the first light incident surface 501 along the light exit direction; a fourth total reflection surface 504 is disposed between the second light incident surface 502 and the first light outgoing surface 503 for the total reflection of light from the second light incident surface 502 to the first light outgoing surface 503.

The above structure can converge the light output from the light source 001 to improve the light output efficiency and lighting effect. In this embodiment, a reflective plate 105 located behind the bottom surface 102 of the rectangular light guide plate 100 is further provided to further submit the light effect.

The condenser lens 500 and the parallel light lens group 300 can be separately assembled and assembled. In order to make the structure compact, the condenser lens 500 and the parallel light lens group 300 are integrally molded and manufactured, and it is difficult to process if they are also integrally extruded and processed with the lamp cover 800 at this time. Therefore, when the lamp cover 800 and the optical element 1000 are integrally manufactured, the condenser lens 500 can be eliminated.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. An optical element, comprising:
   a rectangular light guide plate (100), comprising a front surface (101) for outgoing light, a bottom surface (102) for guiding light, a first side surface (103) for receiving light and a second side surface (104) opposite to the first side surface (103);
   a light source setting portion (200), located on the outer side of the bottom surface (102) near the first side surface (103) and provided with a central axis (002) where the light source (001) is set, and a light emitting direction of the light source (001) faces away from the rectangular light guide plate (100);
   a parallel light lens group (300), disposed at a side of the light source setting portion (200) near the rectangular light guide plate (100), and comprising at least one convex lens (301) arranged along a light-emitting direction of the light source (001);
   and a total reflection lens group (400), disposed between the parallel light lens group (300) and the first side surface (103), a part of the parallel light from the parallel light lens group (300) is subjected to total reflection at least once to form a first parallel light (401) parallel to the front surface (101), and the first parallel light enters the first side surface (103) to make the second side surface (104) emit light; another part of the parallel light from the parallel light lens group (300) is totally reflected at least twice to form a second parallel light (402) oblique to the front surface (101), and the second parallel light enters the first side surface (103) to make the front surface (101) emit light;
   wherein the convex lens (301) comprises a flat light incident surface (3011), an arc-shaped outgoing light surface (3012) provided on a side of the light source setting portion (200), an arc-shaped light incident surface (3013) provided between the flat light incident surface (3011) and the central axis (002), and a parallel light total reflection surface (3014) arranged along the light exit direction outside the arc-shaped light incident surface (3013), and the reflected light of the parallel light total reflection surface (3014) is directed toward the total reflection lens group (400).

2. The optical element as claimed in claim 1, wherein the total reflection lens group (400) comprises:
   a first total reflection surface (403), disposed on a side of the parallel light lens group (300) away from the light source and totally reflecting parallel light from the parallel light lens group (300);
   a second total reflection surface (404), disposed on a side of the first total reflection surface (403) near the rectangular light guide plate (100) to form a first parallel light (401);
   and a third total reflection surface (405), disposed on the opposite side of the second total reflection surface to form a second parallel light (402).

3. The optical element as claimed in claim 2, wherein the light incident surface corresponding to the first total reflection surface (403) is disposed between the parallel light lens group (300) and the total reflection lens group (400).

4. The optical element as claimed in claim 1, wherein the rectangular light guide plate (100) and the total reflection lens group (400) are integrally molded and manufactured, or the rectangular light guide plate (100), the total reflection lens group (400), and the parallel light lens group (300) are integrally formed and manufactured.

5. The optical element as claimed in claim 1, wherein the second side surface (104) is provided with a light diffusion structure.

6. The optical element as claimed in claim 1, wherein the bottom surface (102) is provided with a plurality of strip-shaped light guide curved surfaces (1021), and the light guide curved surface (1021) extends along a direction parallel to the first side surface (103) and is arranged parallel to each other along a direction perpendicular to the first side surface (103).

7. The optical element as claimed in claim 6, wherein an separation distance between adjacent light guide curved surfaces (1021) becomes smaller and smaller as the direction away from the light source setting portion (200), the curvature of the light guide curved surface (1021) increases as the light guide curved surface (1021) is away from the direction of the light source setting portion (200).

8. The optical element as claimed in claim 1, wherein further comprising a condenser lens (500) provided at the light source setting portion (200).

9. The optical element as claimed in claim 8, wherein the condenser lens (500) comprises: a first light incident surface (501), disposed in a middle region in a light emitting direction of the light source setting portion (200);
   a second light incident surface (502), disposed on a side of the light source setting portion (200) away from the rectangular light guide plate (100) in a light emitting direction;
   a first light outgoing surface (503), disposed outside the first light incident surface (501) along the light exit direction;
   a fourth total reflection surface (504), disposed between the second light incident surface (502) and the first light outgoing surface (503), and configured to totally reflect light from the second light incident surface (502) to the first light outgoing surface (503).

10. The optical element as claimed in claim 9, wherein the condenser lens (500) and the parallel light lens group (300) are integrally molded and manufactured.

11. The optical element as claimed in claim 1, wherein the rectangular light guide plate (100) is a diffusion plate with a diffusing agent.

12. A shelf lamp with the above optical element, comprising a mounting bracket (600), a printed circuit board (700), a light source (001), and the optical element (1000) as claimed in claim 1 provided on the mounting bracket (600).

13. The shelf lamp as claimed in claim 12, wherein further comprising a lamp cover (800) disposed outside the light source (001) and connected to the mounting bracket (100).

14. The shelf lamp as claimed in claim 13, wherein the lamp cover (800) is a closed cavity in a plane perpendicular to the length direction of the printed circuit board (700), or the lamp cover (800) is combined with the optical element (1000) to form the closed cavity.

* * * * *